US007381367B1

(12) United States Patent
Baker et al.

(10) Patent No.: US 7,381,367 B1
(45) Date of Patent: Jun. 3, 2008

(54) ALUMINUM ELECTROLYTIC CAPACITOR HAVING AN ANODE HAVING A UNIFORM ARRAY OF MICRON-SIZED PORES

(75) Inventors: R. Terry K. Baker, Hopkinton, MA (US); Nelly M. Rodriguez, Hopkinton, MA (US)

(73) Assignee: Catalytic Materials, LLC, Pittsboro, NC (US)

( * ) Notice: Subject to any disclaimer, the term of this patent is extended or adjusted under 35 U.S.C. 154(b) by 330 days.

(21) Appl. No.: 11/386,535

(22) Filed: Mar. 21, 2006

Related U.S. Application Data

(60) Provisional application No. 60/663,691, filed on Mar. 21, 2005.

(51) Int. Cl.
*B22F 3/11* (2006.01)

(52) U.S. Cl. .......................... 419/2; 361/509; 361/523; 361/529; 361/528; 427/58

(58) Field of Classification Search ................ 361/509, 361/529, 523, 528; 427/63, 70, 97.3, 98.4, 427/102, 126.4; 423/418.2, 422, 437.2, 459; 428/848.3, 550, 613, 628, 654, 408; 29/17.9; 75/315, 383, 412; 419/2
See application file for complete search history.

(56) References Cited

U.S. PATENT DOCUMENTS

| | | | | |
|---|---|---|---|---|
| 5,618,875 | A | 4/1997 | Baker et al. | |
| 6,537,515 | B1 | 3/2003 | Baker et al. | |
| 6,839,224 | B2 | 1/2005 | O'Phelan et al. | |
| 7,147,534 | B2 * | 12/2006 | Chen et al. | 445/50 |
| 2006/0023401 | A1 * | 2/2006 | Naito et al. | 361/526 |
| 2006/0044736 | A1 * | 3/2006 | Taketani et al. | 361/523 |
| 2006/0068096 | A1 * | 3/2006 | Tang et al. | 427/248.1 |

* cited by examiner

*Primary Examiner*—Michael Cleveland
*Assistant Examiner*—Tabassom Tadayyon Eslami
(74) *Attorney, Agent, or Firm*—Henry E. Naylor; Kean, Miller, Hawthorne, D'Armond, McCowan & Jarman, LLP

(57) ABSTRACT

A method for making an aluminum foil anode for an aluminum electrolytic capacitor. This invention also relates to an aluminum anode foil for use in an electrolytic capacitor as well as an aluminum electrolytic capacitor having increased capacitance and substantially uniform pore size distribution.

22 Claims, 1 Drawing Sheet

Mask
1a
Substrate

Catalyst Particles
1b

1c
Catalyst on Substrate

1f
Pitted Aluminum Foil

1e
Aluminum Powder Applied

1d
Nanofibers Grown on Substrate

ALUMINUM ELECTROLYTIC CAPACITOR HAVING AN ANODE HAVING A UNIFORM ARRAY OF MICRON-SIZED PORES

CROSS REFERENCE TO RELATED APPLICATIONS

This application claims priority to Provisional Application Ser. No. 60/663,691 filed Mar. 21, 2005.

FIELD OF THE INVENTION

The present invention relates to a method for making an aluminum foil anode for an aluminum electrolytic capacitor. This invention also relates to an aluminum electrolytic capacitor having increased capacitance and substantially uniform pore size distribution.

BACKGROUND OF THE INVENTION

Aluminum electrolytic capacitors have several important commercial uses. For example, they are used: (a) for general purpose smoothing of signals (ripple current); (b) for energy storage in power supplies; (c) in pulse applications that release large bursts of energy in a short period of time (e.g., flash attachments for cameras, strobes and implantable defibrillators); and (d) specialty applications such as in starting motors for automobiles.

Aluminum electrolytic capacitors are typically fabricated from two strips of aluminum foil (99.99% purity), about 50 μm in thickness with a sheet of porous electrolytic paper interposed between them and wound in the form of a cylinder. One of the aluminum strips is coated with an aluminum oxide layer that acts as the dielectric on the anode. The surface of the other strip is maintained in the metallic state and functions as the cathode. The completed winding is inserted in an aluminum can where the porous paper is vacuum impregnated with the electrolyte (e.g. adipic acid, ammonium pentaborate or ethylene glycol/ammonia). After the capacitor has been sealed in the can, it is re-formed by subjecting it to a DC potential that is sufficient to repair any damage to the oxide layer created during fabrication. Patent application 20030223178, which is incorporated herein by reference teaches an aluminum electrolytic capacitor suitable for use in defibrillators.

The capacitance of an aluminum electrolytic capacitor can be determined from the following relationship:

$$C = \frac{\kappa \varepsilon_o A}{d}$$

where C is the capacitance, κ and $\in_o$ are the dielectric constant and permittivity, respectively for alumina, A is the surface area of the anode and d is the thickness of the alumina layer. It is evident from inspection of this equation that most of the parameters are constant and that in order to increase capacitance, one must enhance the surface area of the anode.

The main approach to increasing the surface area of the anode is by electrochemical etching in a chloride solution with alternating or concurrent DC and AC currents. It has been found that by following this protocol it is possible to enhance the surface area of the aluminum foil by almost two orders of magnitude. Unfortunately, the electrochemical etching technique generates an undesirable wide pore size distribution and it is impossible to create the desired surface architecture to give the optimum capacitor performance. Ideally, one would like to produce a surface having pores of about 1 μm in diameter with a nearest neighbor spacing of about 10 μm. It is possible to achieve this goal by using laser or lithography/etching techniques, however, these tend to be very expensive approaches. There is therefore a need in the art for a method for producing aluminum electrolytic capacitors with an anode having increased capacitance and a substantially uniform pore size.

SUMMARY OF THE INVENTION

In accordance with the present invention there is provided a method for producing an anode for an aluminum electrolytic capacitor, which method comprising:

(i) placing a mask on top of a suitable substrate, which mask contains openings of a predetermined pattern and substantially uniform size and which substrate is one that will decompose at substantially the same conditions as graphite;

(ii) applying catalytic metal particles of a desired average particle size onto the mask which metal particles are capable of catalyzing the growth of carbon nanofibers;

(iii) removing said mask from said substrate resulting in a predetermined pattern of catalytic metal particle sites on the substrate;

(iv) growing carbon nanofibers from the catalytic metal particles on said substrate, which carbon nanofibers are grown substantially perpendicular to the surface of the substrate; and which carbon nanofibers are grown by reacting the catalytic metal particles with a carbon-containing gas at temperatures at which the carbon-containing gas will decompose, but which temperature will not cause a deleterious affect to the carbon nanofibers;

(v) depositing aluminum powder onto said carbon nanofiber-containing substrate, which aluminum powder is of a particle size that will substantially cover the entire surface of the substrate and surround the carbon nanofibers;

(vi) sintering said aluminum powder; and (vii) decomposing the carbon nanofibers and substrate thereby resulting in an aluminum foil having a predetermined pattern of holes of substantially uniform size.

In a preferred embodiment the substrate is comprised of a graphite sheet material.

In another preferred embodiment the carbon nanofibers are graphitic and are comprised of graphite platelets that are aligned substantially perpendicular to the longitudinal axis of the nanofiber.

In still another preferred embodiment the carbon nanofibers are graphitic and are comprised of graphite platelets that are aligned at an angle other than perpendicular to the longitudinal axis of the nanofiber.

In yet another preferred embodiment the size of the holes in the mask is from about 0.5 to 1.5 microns.

Also in accordance with the present invention is an aluminum electrolytic capacitor containing the aluminum foil anode of this invention.

BRIEF DESCRIPTION OF THE FIGURE

The sole FIGURE hereof, which is labeled FIG. 1 and is comprised of parts 1*a*-1*f* is a simplistic representation of the various stages of the present process for producing an aluminum electrolytic capacitors using carbon nanofiber technology.

DETAILED DESCRIPTION OF THE INVENTION

Figure 1:
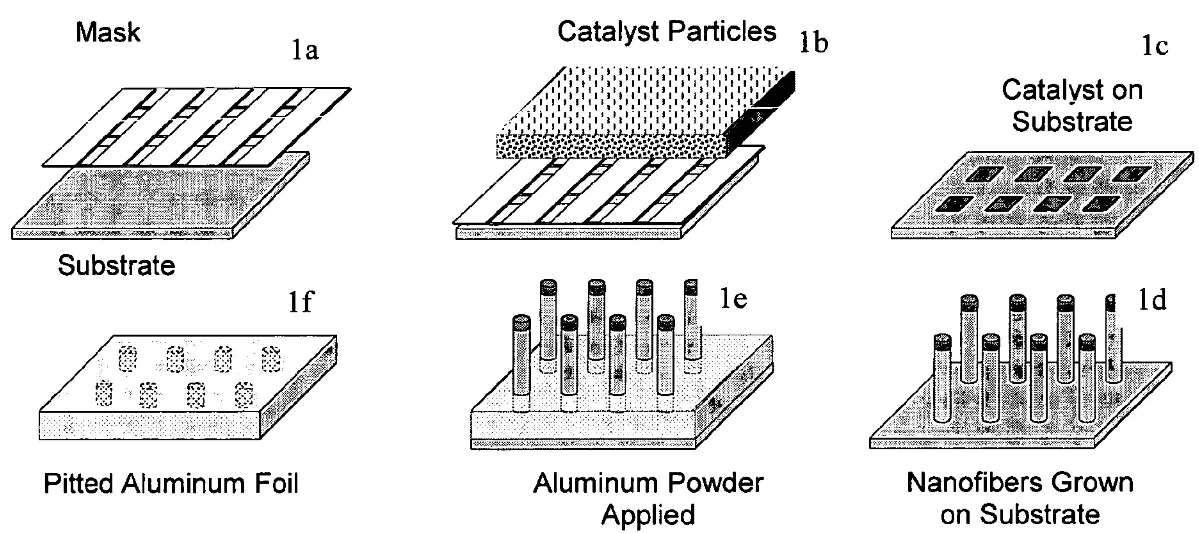

The method of the present invention incorporates the use of carbon nanofibers that are produced by the decomposition of a carbon-containing compound over metal catalyst particles at temperatures of about, 450° C. to about 800° C., preferably from about 500° C. to about 700° C., and more preferably from about 500° C. to about 600° C. The width of the carbon nanofibers is controlled by the size of the catalyst particle that in turn is manipulated by the substrate and treatment conditions employed. The present method generally involves: (i) placing a mask on top of a suitable substrate, which mask contains openings of a predetermined pattern and substantially uniform size; (ii) applying a layer of catalytic metal particles of a desired average particle size onto the mask/substrate; (iii) removing said mask from said substrate resulting in a predetermined pattern of catalytic metal sites on the substrate; (iv) growing carbon nanofibers from the catalytic metal particles on said substrate, which carbon nanofibers are grown substantially perpendicular to the surface of the substrate; and which carbon nanofibers are grown by reacting the catalytic metal particles with a carbon-containing gas at temperatures at which the carbon-containing gas will decompose, but not cause a deleterious affect to the carbon nanofibers; (v) depositing aluminum powder onto said carbon nanofiber-containing substrate; (vi) sintering said aluminum powder; (vii) decomposing the carbon nanofibers and substrate and resulting in an aluminum foil having a predetermined pattern of holes of substantially uniform size.

The aluminum foil anode produced in accordance with this invention will typically contain an alumina coating formed when the carbon nanofibers and substrate, especially when the substrate is a graphite sheet, are decomposed, preferably by gasification. The alumina coated aluminum foil, or sheet, can be used as the anode for an aluminum electrolytic capacitor. The process of the present invention is better understood by reference to FIG. 1 hereof. FIG. 1*a* shows a mask placed on top of a suitable substrate material. The substrate material will be of any material suitable for use herein and one that will decompose at substantially the same conditions as the carbon nanofibers. Since it is preferred that carbon nanofibers be decomposed by gasification it is preferred that the substrate be comprised of a graphite material, preferably a graphite sheet. The mask will contain a pattern of cutouts, or holes, of sufficient pattern and size that will substantially correspond to the predetermined pattern and size of holes in the final aluminum anode foil. The mask can be made from any suitable material and by any suitable fabrication technique. The mask is preferably comprised of a stainless steel of polymeric material. A polymeric material is preferred and it is preferably produced by conventional lithographic techniques that results in the desired array of holes. It is more preferred that the holes be about 2 micron in diameter with a pitch, or spacing, of about 3 microns.

FIG. 1*b* hereof shows a layer of catalytic metal particles that was applied on to the mask/substrate, which catalytic metals are selected from those that are capable of catalyzing the growth of carbon nanofibers. Any suitable technique can be used to apply the layer of catalytic metal particles. One preferred technique is to use an aqueous solution containing metal nitrates introduced via an atomized spray device at about room temperature. The metal nitrate solution is allowed to dry overnight in air in an oven at conventional drying temperatures, preferably at about 120° C. Following this step, the resulting catalyst/substrate combination is calcined in air at calcination conditions, preferably at a temperature of about 250° C. and preferably in a horizontal tube furnace for an effective amount of time to convert the nitrate salts to the respective oxides. Effective amounts of time will be from about 2 to about 4 hours, preferably about 3 hours. Finally, the catalyst/substrate is heated in a $H_2$/He stream to a temperature of 350° C. for 24 hours in order to form the metallic catalytic particles. It is preferred that the amount of $H_2$ in the $H_2$/He stream be from about 5 to 20 vol. %, more preferably about 10 vol. %.

In another preferred technique, the metal particles are introduced onto the masked substrate using vacuum deposition of spectrographically pure metal wire from a heated tungsten filament. Since the metal particles are introduced onto the substrate in the metallic state in this technique, there is no need for drying or calcination. Prior to use, however, it is preferred to perform a mild reduction treatment at elevated temperature, preferably from about 150° C. to about 250° C., more preferably at about 200° C. in a $H_2$/He stream, as defined above.

After the catalytic metal particles are applied to the mask/substrate the mask is removed leaving a pattern of catalytic metal particles of the substrate surface, as shown in FIG. 1*c* hereof. The substrate containing the array of catalytic metal particles is now subjected to a gaseous carbon-containing atmosphere at temperatures from about 450° C. to about 800° C., preferably from about 500° C. to about 700° C., and more preferably from about 500° C. to about 600° C. The choice of catalytic metal and the choice of carbon-containing atmosphere, as well as temperature of decomposition, will be dependent on the type of carbon nanofiber one wishes to grow. Catalysts suitable for growing the carbon nanostructures of the present invention include single metals, as well as alloys and multi-metallics.

If the catalyst is a single metal then it will be a Group VIII metal selected from Fe, Ni, and Co. If the catalyst is an alloy or multimetallic material, then it is comprised of a first metal component that will be one or more Group VIII metals and a second metal that is preferably one or more Group IB metals, such as Cu, Ag, and Au. Preferred are Cu and Ag with Cu being the most preferred. If the catalyst is an alloy or multimetallic it is preferred that the catalyst be comprised of two Group VIII metals or one Group VIII metal and one Group IB metal. It will be understood that Zn can be used in place of one or more of the Group VIII metals. The Group IB metals is present in an amount ranging from about 0.5 to 99 at. % (atomic %). For example, the catalyst can contain up to about 99 at. %, even up to about 70 at. %, or even up to about 50 at. %, preferably up to about 30 at. %, more preferably up to about 10 at. %, and most preferably up to about 5 wt. % copper, of Group IB metal with the remainder being a Group VIII metal, preferably nickel or iron, more preferably iron. Catalysts having a high copper content (70 at. % to 99 at. %) will typically generate nanofibers which are predominantly helical or coiled, and which have a relatively low crystallinity (from about 5 to 25%). Lower concentrations of copper, e.g., 0.5 to 30 at. % have a tendency to produce spiral and branched nanofibers, whereas a catalyst with about 30 to 70 at. %, preferably 30 to 50 at. % copper will produce predominantly branched nanofibers.

A third metal can also be present. Although there is no limitation with respect to what the particular third metal can be, it is preferred that it be selected from the group consisting of Ti, W, Sn and Ta. When a third metal is present, it is substituted for up to about 20 at. %, preferably up to about 10 at. %, and more preferably up to about 5 at. %, of the second metal. It is preferred that the catalyst be comprised of Cu in combination with Fe, Ni, or Co. More preferred is Cu in combination with Fe and/or Ni from an economic point of view. A catalyst of which Fe is used in place of some of the Ni would be less expensive than a catalyst comprised of Cu in combination with only Ni. If it is carbon nanofiber having graphite platelets aligned substantially perpendicular to the longitudinal axis is desired, then the preferred catalyst is iron:copper bimetallic in powder form.

Carbon-containing compounds suitable for preparing the carbon nanofibers of the present invention are compounds composed mainly of carbon atoms and hydrogen atoms, although carbon monoxide can also be used. The carbon-containing compound, which is typically introduced into the heating zone in gaseous form, will generally have no more than 8 carbon atoms, preferably no more than 6 carbon atoms, more preferably no more than 4 carbon atoms, and most preferably no more than 2 carbon atoms. Non-limiting examples of such compounds include CO, methane, ethane, ethylene, acetylene, propane, propylene, butane, butene, butadiene, pentane, pentene, cyclopentadiene, hexane, cyclohexane, benzene, toluene. Combinations of gases are preferred, particularly carbon monoxide and ethylene.

It may be desirable to have an effective amount of hydrogen present in the heating, or growth, zone during nanostructure growth. Hydrogen serves two complementary functions. For example, on the one hand it acts as a cleaning agent for the catalyst, and on the other hand it hydrogasifies, or causes carbon burn-off, of the carbon structure. By an effective amount, we mean that minimum amount of hydrogen that will maintain a clean catalyst surface (free of carbon residue), but not so much that will cause excessive hydrogasification, or burn-off, of carbon from the nanostructures and/or substrate structure, if present. Generally, the amount of hydrogen present will range from about 5 to 40 vol. %, preferably from about 10 to 30 vol. %, and more preferably from about 15 to 25 vol. %. For some catalyst systems, such as Cu:Fe, the hydrogasification reaction is relatively slow, thus, an effective amount of hydrogen is needed to clean the catalyst in order to keep it clean of carbon residue and maintain its activity. For other catalyst systems, such as Cu:Ni, where the activity is so high that excessive hydrogasification occurs, even at relatively low levels of hydrogen, little, if any, hydrogen is needed in the heating zone.

The decomposition of $CO/H_2$ at about 575° C. to about 625° C. over a graphite supported iron-based catalyst to generate "platelet" carbon nanofibers or the decomposition of $C_2H_4/H_2$ at the same temperature over graphite supported nickel-based catalysts to produce "herring-bone" carbon nanofibers. Platelet structures will be those wherein the graphite platelets are oriented substantially perpendicular to the longitudinal, or growth, axis of the nanofiber. Such nanofibers are disclosed in U.S. Pat. No. 6,537,515 which is incorporated herein by reference. In that patent the preferred catalyst is an Fe:Cu bimetallic catalyst. A herringbone structure will be one wherein the graphite platelets are oriented at an angle to the longitudinal axis. These reactions will be conducted in a reactor in which the catalyst/substrate is positioned in such a manner that the nanofibers will grow in a perpendicular direction from the substrate surface under the influence of gravity and an induced magnetic field. The width of the individual columnar structures will be about 100 nanometers (nm) and will be very close to their nearest neighbors, thus creating a cluster diameter of 1 square micron. It is anticipated that the fibers will not have the thickness that this application requires, however, previous work has demonstrated that it is possible to grow "bundles of fibers" on screen-printed surfaces and that the size of these bundles can be controlled by concentration of the catalyst precursor and the treatment conditions.

A further option for increasing the width of structures involves the incorporation of a "thickening step" in the nanofiber growth process. This is generally accomplished by raising the temperature to a region where the uncatalyzed decomposition of the hydrocarbon is the prevailing reaction. Under these circumstances, pyrolytic carbon is deposited on the walls of the nanofibers that were catalytically formed at lower temperatures. Indeed, this concept is the basis for the production of larger-sized vapor grown carbon fibers. FIG. 1*d* hereof shows carbon nanofibers grown on a substrate. The ends of the carbon nanofibers show the catalyst particle from which it was grown. Although the nanofibers are represented as cylindrical in the FIGURE hereof it will be understood that non-cylindrical nanofibers are preferred. The preferred nanofibers will be multi sided.

It is preferred to grow the carbon nanofibers in a way that gravity aids in their properly aligned growth. For example, the carbon nanofibers can be grown in a suitable furnace such that the surface of the substrate containing the array of metal catalyst is oriented facing downward so that as the carbon nanofibers grow they will grow straight downward perpendicular to the substrate. After the formation of the carbon nanofibers on the substrate surface, powdered aluminum of sufficiently small particle size is applied so that a layer is formed over the entire substrate surface and surrounding, but not covering, all of the carbon nanofibers, as shown in FIG. 1*e* hereof. The aluminum powder can be applied by any suitable technique as previously mentioned, such as by powder metallurgy or by vacuum deposition from a heated tungsten filament at a residual pressure of $10^{-6}$ Torr in a vacuum evaporation unit. The aluminum powder is sintered by conventional techniques, such as in an inert atmosphere at temperatures from about 350° C. to about 425° C. in order to volatize any solid lubricant that was added to the powder. After lubricant volatization it is preferred to further heat the substrate containing the carbon nanofibers and aluminum powder to a temperature of about 600° C. and maintain that heat for about 5 to 30 minutes. After sintering, the material is allowed to slowly cook to about 425° C. in an inert gas environment ad finally the temperature is decreased to about room temperature.

The composite structure comprised of substrate, carbon nanofibers and sintered aluminum powder is now subjected to conditions that will decompose the carbon nanofibers and substrate, both of which are sacrificial in the preparation of the aluminum anode foil of the present invention. Preferred conditions are gasification conditions that will result in the gasification of both the carbon substrate and the carbon nanofibers at temperatures below the decomposition temperature of the product aluminum foil. During such a process, cavities (pores) of approximately the same dimensions as those of the carbon nanofibers will be created in the aluminum sheet and an aluminum oxide layer will also form on the surface of the aluminum sheet. This product aluminum foil can be used as an anode having superior properties for an aluminum electrolytic capacitor. The aluminum electrolytic capacitor typically includes two long strips of aluminum foil with two long strips of paper, known as separators, in between them. One of the aluminum foils serves as a cathode (negative) foil, and the other serves as an anode (positive) foil. Each foil has an aluminum tab, extending from its top edge, to facilitate electrical connection to other parts of the capacitor.

The foil-and-paper assembly, known as the active element, is rolled around a removable spindle or mandrel to form a cylinder and placed in a round tubular case, with the two tabs extending toward the top of the case. The paper is soaked, or impregnated, with a liquid electrolyte—a very electrically conductive solution containing positive or negative ions. And, the tubular case is sealed shut with a lid called a header. Extending from the header are two terminals connected respectively to the anode foil and cathode foil via the aluminum tabs.

What is claimed is:

1. A method for producing an anode for an aluminum electrolytic capacitor, which method comprising:

(i) placing a mask on top of a suitable substrate, which mask contains openings of a predetermined pattern and substantially uniform size and which substrate is one that will decompose at about the same conditions as graphite;

(ii) applying a catalytic metal particles of a desired average particle size onto the mask;

(iii) removing said mask from said substrate resulting in a predetermined pattern of catalytic metal sites on the substrate;

(iv) growing carbon nanofibers from the catalytic metal particles on said substrate, which carbon nanofibers are grown substantially perpendicular to the surface of the substrate; and which carbon nanofibers are grown by reacting the catalytic metal particles with a carbon-containing gas in at temperatures at which the carbon-containing gas will decompose, but not cause a deleterious affect to the carbon nanofibers;

(v) depositing aluminum powder onto said carbon nanofiber-containing substrate;

(vi) sintering said aluminum powder; and (vii) decomposing the carbon nanofibers and substrate and resulting in an aluminum foil having a predetermined pattern of holes of substantially uniform size.

2. The method of claim 1 wherein the substrate is comprised of graphite.

3. The method of claim 1 wherein the catalytic metal is selected from Fe, Ni, Co, and mixtures thereof.

4. The method of claim 3 wherein the catalytic metal is selected from Fe and Ni.

5. The method of claim 3 wherein there the catalytic metal is a bimetallic comprised of a Group VIII metal and a Group IB metal.

6. The method of claim 5 wherein the Group VIII metal is selected from Fe and Ni and the Group IB metal is Cu.

7. The method of claim 1 wherein the mask is comprised of a material selected from a stainless steel and a polymeric material.

8. The method of claim 1 wherein the openings of the mask are from about 0.5 to 1.5 microns in size.

9. The method of claim 1 wherein the nanofibers are decomposed by gasification.

10. The method of claim 1 wherein the carbon-containing gas is selected from the group consisting of CO, methane, ethane, ethylene, acetylene, propane, propylene, butane, butene, butadiene, pentane, pentene, cyclopentadiene, hexane, cyclohexane, benzene, and toluene.

11. The method of claim 10 wherein the carbon-containing gas is CO.

12. The method of claim 10 wherein hydrogen is also present with the carbon-containing gas.

13. The method of claim 12 wherein hydrogen is also present with the CO.

14. A method for producing an anode for an aluminum electrolytic capacitor, which method comprising:

(i) placing a mask on top of a graphite substrate, which mask contains openings of a predetermined pattern and substantially uniform size from about 0.5 to about 1.5 microns;

(ii) applying a catalytic metal particles of a desired average particle size onto the mask, which catalytic metal is selected from Fe, Ni, Co, and mixtures thereof;

(iii) removing said mask from said substrate resulting in a predetermined pattern of catalytic catalytic metal sites on the substrate;

(iv) growing carbon nanofibers from the catalytic metal particles on said substrate, which carbon nanofibers are grown substantially perpendicular to the surface of the substrate; and which carbon nanofibers are grown by reacting the catalytic metal particles with a carbon-containing gas in at temperatures at which the carbon-containing gas will decompose, but not cause a deleterious affect to the carbon nanofibers;

(v) depositing aluminum powder onto said carbon nanofiber-containing substrate;

(vi) sintering said aluminum powder; and (vii) decomposing the carbon nanofibers and substrate and resulting in an aluminum foil having a predetermined pattern of holes of substantially uniform size.

15. The method of claim 14 wherein there the catalytic metal is a bimetallic comprised of a one of Fe, Ni or Co and a Group IB metal.

16. The method of claim 15 wherein the bimetallic is comprised of Fe or Ni and Cu.

17. The method of claim 14 wherein the mask is comprised of a material selected from a stainless steel and a polymeric material.

18. The method of claim 14 wherein the nanofibers are decomposed by gasification.

19. The method of claim 14 wherein the carbon-containing gas is selected from the group consisting of CO, methane, ethane, ethylene, acetylene, propane, propylene, butane, butene, butadiene, pentane, pentene, cyclopentadiene, hexane, cyclohexane, benzene, and toluene.

20. The method of claim 19 wherein the carbon-containing gas is CO.

21. The method of claim 20 wherein hydrogen is also present with the CO.

22. The method of claim 19 wherein hydrogen is also present with the carbon-containing gas.

* * * * *